J. Bamber,
Coffee Pot.

No. 38,545.        Patented May 19, 1863.

Witnesses
Wm. S. Loughborough
Matthias Smith

Inventor
John Bamber

UNITED STATES PATENT OFFICE.

JOHN BAMBER, OF ROCHESTER, NEW YORK.

IMPROVEMENT IN TEA AND COFFEE POTS.

Specification forming part of Letters Patent No. 38,545, dated May 19, 1863.

*To all whom it may concern:*

Be it known that I, JOHN BAMBER, of Rochester, in the county of Monroe and State of New York, have invented certain new and useful Improvements in Tea and Coffee Pots; and I do hereby declare that the following is a full, clear, and exact description thereof, reference being had to the accompanying drawings, making a part of this specification, in which—

Figure 1:
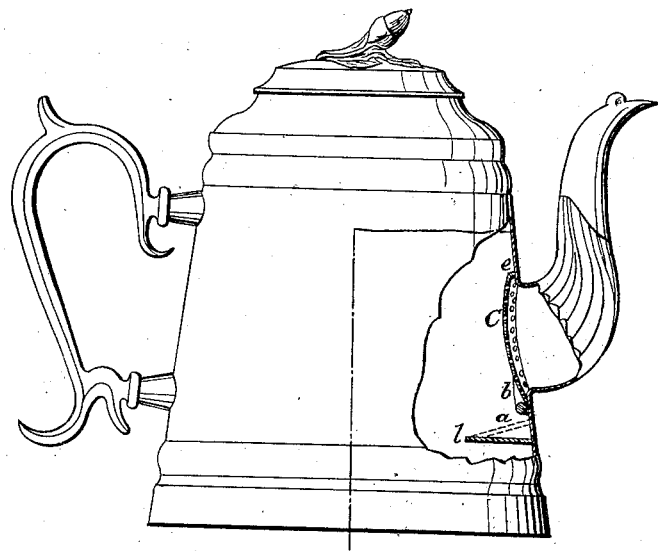
Figure 2:
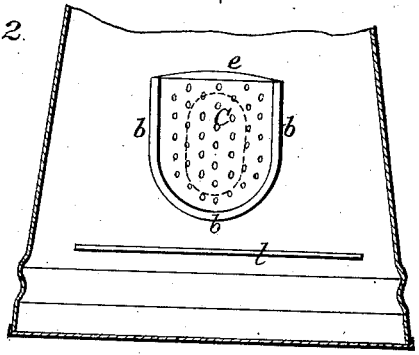

Figure 1 is a side elevation of my invention, a portion of the cylinder being broken away, so as to show the arrangement of the strainer-plate C and the ledge *l*. Fig. 2 is a vertical section of a portion of the cylinder, taken in the direction of the red line in Fig. 1, and giving a front view of the strainer-plate C.

Similar letters of reference indicate corresponding parts in both figures.

This invention consists in the employment of a ledge or guard-plate placed just below the spout, so as to withhold the grounds and prevent them from rising and obstructing the strainer or from mixing and flowing out with the liquid.

To enable others to make and use my invention, I will proceed to describe its construction.

I propose to cut away entirely that portion of the body of the pot within the radius of the end of the spout, and which constitutes the strainer in ordinary tea and coffee pots. I then bend a piece of tinned wire, about in form of the letter U, as seen at *b b b*, Fig. 2, and solder it to the inside of the pot around the opening into the spout. The solder should be applied to the outside of the curved wire, so as to leave an acute angle inside between the wire and surface of the pot, for the edge of the perforated strainer-plate C to catch in, whereby it is securely held in position. The plate C may be made of tin or other suitable material, and it should be so snugly fitted as to require some pressure to either adjust it in position or remove it. It may be made somewhat crowning, as seen in Fig. 1, and provided at the top with a projecting lip, *e*, curved to fit the circle of the pot. The spouts of tea and coffee pots unavoidably become more or less choked by the sediment which collects in them, and as they have been constructed heretofore it is almost impossible to remove this obstruction without injury to the spout or strainer, the latter being frequently rendered entirely useless in the attempt; whereas, with the removable strainer it and the spout may be cleaned at any time and with the greatest facility. The strainer C is removed by placing the fingers near the lower edge and pressing it upward out of its seat. The ledge or guard-plate *l* is made of tin, one edge being straight and the other cut to fit the circle of the pot, to which it is soldered about in the position shown in the drawings. It is designed to prevent the tea or coffee grounds from settling against the strainer and obstructing it, and also to prevent the fine particles from intermixing and passing out with the fluid. If desirable this plate *l* may be placed angling, as shown by the dotted lines *a*, Fig. 1, to prevent the lodgment of the grounds thereon while boiling.

What I claim as my invention is—

The application of the ledge or guard-plate *l*, as and for the purposes set forth.

JOHN BAMBER.

Witnesses:
WM. S. LOUGHBOROUGH,
MATTHIAS SMITH.